Figure 1:
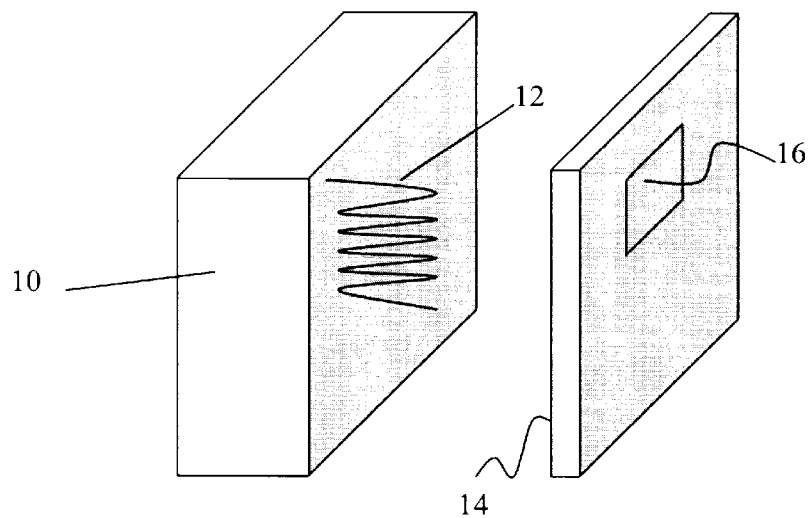

United States Patent [19]
Vanstone

[11] Patent Number: 5,955,717
[45] Date of Patent: Sep. 21, 1999

[54] TRANSACTION VERIFICATION PROTOCOL FOR SMART CARDS

[75] Inventor: Scott A. Vanstone, Waterloo, Canada

[73] Assignee: Certicom Corp., Mississauga, Canada

[21] Appl. No.: 08/790,545

[22] Filed: Jan. 30, 1997

[30] Foreign Application Priority Data

Jan. 31, 1996 [GB] United Kingdom .................. 9601924

[51] Int. Cl.⁶ ............................................ G06K 05/00
[52] U.S. Cl. .................................. 235/380; 235/23
[58] Field of Search ............................ 235/380, 382, 235/379, 492; 380/9, 23, 24, 25, 30, 50

[56] References Cited

U.S. PATENT DOCUMENTS 5,295,188  3/1994  Wilson et al. .................... 235/379
5,455,407  10/1995  Rosen .............................. 235/380
5,485,519  1/1996  Weiss .............................. 380/23

FOREIGN PATENT DOCUMENTS

0588339 A2  3/1994  European Pat. Off. .

*Primary Examiner*—Thien Minh Le
*Attorney, Agent, or Firm*—Baker & Maxham

[57] ABSTRACT

A protocol appropriate for use with smartcard purchase applications such as those that might be completed between a terminal or ATM and a users personal card. The protocol provides a signature scheme which allows the card to authenticate the terminal without unnecessary signature verification which is an computationally intense operation for the smart card. The only signature verification required is that of the terminal identification (as signed by the certifying authority, or CA, which is essential to any such protocol). In the preferred embodiment, the protocol provides the card and terminal from fraudulent attacks from impostor devices, either a card or terminal.

7 Claims, 2 Drawing Sheets

| Smartcard Action | Transmission | Terminal Action |
|---|---|---|
| | | Generate unique purchase ID and create transaction message |
| | ◄──── Purchase ID, TA 220 bits [TIU ID, $Y_T$] CA 355 bits | |
| Verify Certificate signed by CA 15,500 clock cycles Generate Random Number (R2) and sign transaction number using terminal's public key 15,500 clock cycles | | |
| Send signed transaction data, hash and certificate signed by CA | ────► [r1,s1] card 375 bits Hash 128 bits [Smartcard ID, Smartcard Public Key] CA 355 bits | |
| | ◄──── | Verify Certificate signed by CA Given the hash h and s1, deduce $\alpha^{kT}$ session key Recover message from r1 |
| | R2 100 bits | Send R2 contained in message to card to prove identity and to acknowledge the provision of service |
| Check R2 to complete transaction | | |
| Total computation time = 31,000 clock cycles | Total bits transmitted = 1533 | |

Figure 2

TRANSACTION VERIFICATION PROTOCOL FOR SMART CARDS

The present invention relates to methods and apparatus for verifying the authenticity of partners in an electronic transaction.

It has become widely accepted to conduct transactions such that as financial transactions or exchange of documents electronically. In order to verify the transaction, it is also well-known to "sign" the transaction digitally so that the authenticity of the transaction can be verified. The signature is performed according to a protocol that utilizes the message, i.e. the transaction, and a secret key associated with the party. Any attempt to tamper with the message or to use a key other than that of the signing party will result in an incompatibility between the message and the signature or will fail to identify the party correctly and thereby lead to rejection of the transaction.

The signature must be performed such that the parties' secret key cannot be determined. To avoid the complexity of distributing secret keys, it is convenient to utilize a public key encryption scheme in the generation of the signature. Such capabilities are available where the transaction is conducted between parties having access to relatively large computing resources but it is equally important to facilitate such transactions at an individual level where more limited computing resources are available.

Automated teller machines (ATMs) and credit cards are widely used for personal transactions and as their use expands, so the need to verify such transactions increases. Transaction cards are now available with limited computing capacity, so-called "Smart Cards," but these are not sufficient to implement existing digital signature protocols in a commercially viable manner. As noted above, in order to generate a digital signature, it is necessary to utilize a public key encryption scheme. Most public key schemes are based on the Diffie Helman Public key protocol and a particularly popular implementation is that known as DSS. The DSS scheme utilizes the set of integers Zp where p is a large prime. For adequate security, p must be in the order of 512 bits although the resultant signature may be reduced mod q, where q divides p-1, and may be in the order of 160 bits.

The DSS protocol provides a signature composed of two components r, s. The protocol requires the selection of a secret random integer k from the set of integers (0, 1, 2, ... q-1), i.e.

$$k \in \{0,1,2, \ldots q\text{-}1\}.$$

The component r is then computed such that $$r = \{\beta^k \bmod p\} \bmod q$$

where $\beta$ is a generator of q.
The component s is computed as $$s = [k^{-1}(h(m)) + ar] \bmod q$$

where m is the message to transmitted,
  h(m) is a hash of the message, and
  a is the private key of the user.

The signature associated with the message is then s,r which may be used to verify the origin of the message from the public key of the user.

The value of $\beta^k$ is computationally difficult for the DSS implementation as the exponentiation requires multiple multiplications mod p. This is beyond the capabilities of a "Smart Card" in a commercially acceptable time. Although the computation could be completed on the associated ATM, this would require the disclosure of the session key k and therefore render the private key, a, vulnerable.

An alternative encryption scheme that provides enhanced security at relatively small modulus is that utilizing elliptic curves in the finite field $2^m$. A value of m in the order of 155 provides security comparable to a 512 bit modulus for RSA and therefore offers significant benefits in implementation. Diffie Helman Public Key encryption utilizes the properties of discrete logs so that even if a generator $\beta$ and the exponentiation $\beta^k$ is known, the value of k cannot be determined.

A similar property exists with elliptic curves where the addition of two points on a curve produces a third point on the curve. Similarly, multiplying a point by an integer k produces a point on the curve.

However, knowing the point and the origin does not reveal the value of the integer 'n' which may then be used as a session key for encryption. The value kP, where P is an initial known point, is therefore equivalent to the exponentiation $\beta^k$.

Elliptic Curve Crytposystems (ECC) offer advantages over other public key cryptosystems when bandwidth efficiency, reduced computation, and minimized code space are application goals.

The preferred embodiment of the present invention discloses a protocol optimized for an ECC implementation for use with a "smartcard" having limited computing capacity. The protocol has been found to provide superior performance relative to other smartcard protocols and is achievable with an ECC implementation.

The protocol disclosed is appropriate for smartcard purchase applications such as those that might be completed between a terminal or ATM and a users personal card. The protocol provides a signature scheme which allows the card to authenticate the terminal without unnecessary signature verification which is an computationally intense operation for the smart card. The only signature verification required is that of the terminal identification (as signed by the certifying authority, or CA, which is essential to any such protocol. In the preferred embodiment, the protocol provides the card and terminal from fraudulent attacks from impostor devices, either a card or terminal.

In accordance with the invention there is provided A method of verifying a pair of participants in an electronic transaction to permit exchange of information therebetween, each of the participants includes a memory and having a respective private key t, a and public key $Y_t$, $Y_c$ stored therein, the public keys derived from a generator $\alpha$ and a respective ones of the private keys t, a, the method comprising the steps of:

(a) a first of the participants generating a unique transaction identification information PID upon initiation of the electronic transaction;

(b) the first participant forwarding to a second participant the transaction identification information PID and a first certificate C1, the first certificate being signed by a certification authority according to a predetermined algorithm and including an identification information TIU ID unique to the first participant and the public information $Y_t$ of the first participant;

(c) the second participant verifying the first certificate C1, according to the predetermined algorithm, upon receipt thereof and extracting the identification information TIU ID and the public information Y, therefrom;

(d) the second participant, upon verification of the first certificate C1, generating a first random integer R2;

(e) the second participant generating a first and second signature components r1, s1 utilizing the public key $Y_t$ of the first participant and the private key a of the second participant, respectively according to a predetermined protocol;

(f) the second participant forwarding a message to the first participant, including the signature components r1, s1 and a second certificate C2 signed by the certification authority according to a predetermined algorithm and including an identification information CID unique to the second participant and the public information Yc of the second participant;

(g) the first participant verifying the second certificate C2 and extracting the identification information CID and public key $Y_c$ and verifying the authenticity of the second participant by extracting the transaction identification information PID from the received message and comparing the received transaction identification information PID to the transmitted value;

(h) the first participant extracting the first random integer R2 from the received message and transmitting the first random integer R2 to the second participant to acknowledge verification of the second participant; and (i) the second participant verifying the authenticity of the first participant by comparing the received first random integer R2 to the generated first random integer R2 and transmitting a second random integer R3 to the first participant to acknowledging verification of the first participant, thereby permitting exchange of information between the participants.

An embodiment of the invention will now be described by way of example only with reference to the accompanying drawings, in which:

FIG. 1 is a diagrammatic representation of a scanning terminal and personal transaction card; and FIG. 2 is a chart that schematically illustrates the protocol.

Referring therefore to FIG. 1, a scanner terminal 10 has an inductive coupling 12 to cooperate with a card 14. When a card 14 is passed through the inductive coupling 12 a transaction is recorded within a memory 16 on the card 14. Typically the transaction will debit the card with a set amount, e.g. an admission price, and the terminal 10 is credited a corresponding amount. The terminal is connected through a network to a central computer located at a financial institution that maintains records of transactions in a conventional manner.

To avoid fraudulent transactions being recorded at either the card or terminal the protocol shown in FIG. 2 is utilized.

Upon the scanner sensing the card through coupling 12, a unique purchase I.D. (PID) is generated by the terminal 10. The terminal 10 has a private key, t, stored in a secure location and a corresponding public key $Y^t$ equal to $\alpha^1$. the terminal 10 generates a message, M1, consisting of the purchase I.D. PID and the transaction amount, TA. It also appends to the message M1 a certificate signed by the certifying authority CA that includes terminal identification information TIU ID and the public key $Y_t$. The message M1 is received by the card 14.

Card 14 has a private key a stored securely in memory 16 and a public key $Y_c$ equal to $\alpha^3$. ($\alpha$ is the generator point for the curve). The card verifies the terminals certificate as signed by the certifying authority CA according to a normal elliptic curve scheme. Having verified the certificate, the card generates a pair of random numbers R2 and R3 and signs the unique purchase I.D. PID using the terminals public key according to an established protocol.

To effect signing, the card generates a random integer k and computes a session parameter $\alpha^k$. It also computes $Y_t^k$ and generates signature components r1 and s1.

The component r1 is provided by M2, $Y_t^k$ mod L where:
M2 is the message TA/TIU ID//R2//PID, and
L=$2^1$ and 1 is an integer greater or equal to the number of bits in M2. (// signifies concentration).

The component s1 is provided by h.a+k mod q where:
q is the order of the curve and
h is a hash $h(M2//\alpha^k//R3)$.

The card now sends signature components r1, s1 the hash h and a certificate issued by the certifying authority CA containing its ID and public key to the terminal 10.

The terminal verifies the cards credentials as signed by the CA. Given the hash h and s1 it can calculate the value $\alpha^{kt}$ and thereby recover the message M2 from r1 using the cards public key. As the message M2 includes the PID, the terminal is able to verify the authenticity if the card 10.

The recovered message includes R2 which is then returned to the card 10 to prove that the terminal is extracting R2 in real time, i.e. during the transit of the card through the coupling 12, using its private key. This also prevents a reply attack by the terminal 10.

The receipt of R2 also serves to acknowledge provision of the service. Upon receipt, the card checks R2 to ensure the message was recovered using the terminals private key. This confirms that the card was talking to the terminal rather than a fraudulent device which would not have the private key, t, available.

If the card confirms the receipt of R2, it transmits the random R3 to the terminal 10 to complete the transaction. R3 is required for card signature verification by the bank and so R3 is retained by the terminal 10 for central processing purposes. R3 is not released by the card until it has received R2 which confirms that the terminal 10 is performing computations in real time.

The terminal 10 is required to submit to the financial institution the stored values of R2, R3, TA, PID, TIU ID, s1 and $\alpha^k$ in addition to the credentials of both card and terminal 10. With this information the bank card is able to reproduce hash, h, i.e. $h(M2//\alpha^k//R3)$ by using the cards public key $Y_c$ to prove that the transaction was authentic.

It will be noted that the last two passes are essentially trivial and do not require computation. Accordingly the computation required by the card is minimal, being restricted to one verification and one signature that involves two exponentiations, with the balance avoiding computationally intense operations.

As indicated in FIG. 2, and ECC implementation is the field $2^{155}$ using an anomalous curve of this protocol would result in less bandwidth (1533 bits) and reduced computation for the smartcard (31,000 clock cycles). The computational savings over previous protocols are possible due to features of the elliptic curve signature scheme used by the smartcard.

The particular benefits and attributes may be summarized as:

1. The purchase identifier PID is unique and is required to prevent terminal replay to the bank. If the purchase identifier is not unique, a random number R1 will also be required to provide the equivalent of the PID.

2. The random bit string R2 is required to prevent replay to the card.

3. A has function (h) such as the SHA1 is required to prevent modification of the message (m) and the terminal's identification (TIU ID).

4. There appears to be no advantage to having the transaction amount signed by the terminal, resulting in one less signature verification for the card. The reason for this is that the message signed by the card contains a random number R2 which can only be recovered by the terminal.

5. Using this scheme, the message m may only be recovered by the terminal (note the terminal's public key is used in step III therefore requiring the terminal's private key to verify and recover contents). By demonstrating to the card that the random string (R2) was obtained from the message, the terminal can be authenticated to the card.

I claim:

1. A method of verifying a pair of participants in an electronic transaction to permit exchange of information therebetween, each of said participants includes a memory and having a respective private key t, a and public key $Y_t$, $Y_c$ stored therein, said public keys derived from a generator $\alpha$ and a respective ones of said private keys t, a, said method comprising the steps of:

(a) a first of said participants generating a unique transaction identification information PID upon initiation of said electronic transaction;

(b) said first participant forwarding to a second participant said transaction identification information PID and a first certificate C1, said first certificate being signed by a certification authority according to a predetermined algorithm and including an identification information TIU ID unique to said first participant and said public information $Y_t$ of said first participant;

(c) said second participant verifying said first certificate C1, according to said predetermined algorithm, upon receipt thereof and extracting said identification information TIU ID and said public information $Y_t$ therefrom;

(d) said second participant, upon verification of said first certificate C1, generating first and second random integers R2 and R3, respectively;

(e) said second participant generating a third random integer k and computing a session parameter $\alpha^k$ by exponentiating a function including said generator to a power k and exponentiating said public key $Y_t$ to a power k to produce a session key $Y_t^k$;

(f) said second participant generating a first signature component r1 by signing said transaction identification information PID utilizing said public key $Y_t$ of said first participant and generating a second signature component s1 by signing said first random integer R2 utilizing said private key a of said second participant, said signatures being generated according to a predetermined protocol;

(g) said second participant forwarding a message to said first participant, including said signature components r1, s1 and a second certificate C2 signed by said certification authority according to a predetermined algorithm and including an identification information CID unique to said second participant and said public information Yc of said second participant;

(h) said first participant verifying said second certificate C2 and extracting said identification information CID and public key $Y_c$ and verifying the authenticity of said second participant by extracting said transaction identification information PID from said received message and comparing said received transaction identification information PID to said transmitted value;

(i) said first participant extracting said first random integer R2 from said received message and transmitting said first random integer R2 to said second participant to acknowledge verification of said second participant;

(j) said second participant verifying the authenticity of said first participant by comparing said received first random integer R2 to said generated first random integer R2 and transmitting said second random integer R3 to said first participant to acknowledging verification of said first participant, thereby permitting exchange of information between said participants.

2. A method as defined in claim 1, wherein said first participant forwards a transaction amount TA with said identification PID.

3. A method as defined in claim 1, wherein said first signature component r1 combine said session key $Y_t^k$ and a message M2, indicative of the concatenation of said identification information TIU ID, said first random information R2, and said transaction identification information PID.

4. A method as defined in claim 3, wherein said first signature component r1 is of the form $M2^* \, Y_t^k \bmod L$.

5. A method as defined in claim 3, wherein said second signature component s1 is of the form $h^*a+k \bmod q$, where q is the order of an elliptic curve, h is a hash of the concatenation of said second random integer R3, said session parameter $\alpha^k$ and said message M2.

6. A method as defined in claim 5, including in step (g) of claim 1 forwarding said hash to said first participant.

7. A method of verifying a pair of participants in an electronic transaction to permit exchange of information therebetween, each of said participants includes a memory and having a respective private key t, a and public key $Y_t$, $Y_c$ stored therein, said public keys derived from a generator $\alpha$ and a respective ones of said private keys t, a, said method comprising the steps of:

(a) a first of said participants generating a unique transaction identification information PID upon initiation of said electronic transaction;

(b) said first participant forwarding to a second participant said transaction identification information PID and a first certificate C1, said first certificate being signed by a certification authority according to a predetermined algorithm and including an identification information TIU ID unique to said first participant and said public information $Y_t$ of said first participant;

(c) said second participant verifying said first certificate C1, according to said predetermined algorithm, upon receipt thereof and extracting said identification information TIU ID and said public information $Y_t$ therefrom;

(d) said second participant, upon verification of said first certificate C1, generating a first random integer R2;

(e) said second participant generating a first and second signature components r1, s1 utilizing said public key $Y_t$ of said first participant and said private key a of said second participant, respectively according to a predetermined protocol;

(f) said second participant forwarding a message to said first participant, including said signature components r1, s1 and a second certificate C2 signed by said certification authority according to a predetermined algorithm and including an identification information CID unique to said second participant and said public information Yc of said second participant;

(g) said first participant verifying said second certificate C2 and extracting said identification information CID and public key $Y_c$ and verifying the authenticity of said second participant by extracting said transaction identification information PID from said received message and comparing said received transaction identification information PID to said transmitted value;

(h) said first participant extracting said first random integer R2 from said received message and transmitting said first random integer R2 to said second participant to acknowledge verification of said second participant; and (i) said second participant verifying the authenticity of said first participant by comparing said received first random integer R2 to said generated first random integer R2 and transmitting a second random integer R3 to said first participant to acknowledging verification of said first participant, thereby permitting exchange of information between said participants.

* * * * *

UNITED STATES PATENT AND TRADEMARK OFFICE
CERTIFICATE OF CORRECTION

PATENT NO.    : 5,955,717
DATED         : September 21, 1999
INVENTOR(S)   : Scott A. Vanstone It is certified that error appears in the above-identified patent and that said Letters Patent is hereby corrected as shown below:

Column 1,
Line 4, delete "and apparatus"

Column 2,
Line 12, replace "is known" with -- are known --
Line 37, replace "is an" with -- is a --
Line 49, after "$\alpha$ and" and delete "a"
Line 61, replace "public information" with -- public key --
Line 65, replace "public information Y," with -- public key $Y_t$ --

Column 3,
Line 11, replace "public information Yc" with -- public key $Y_c$ --
Line 27, replace "acknowledging" with -- acknowledge --
Line 50, replace "$Y^t$ equal to $\alpha^1$" with -- $Y_t$ equal to $\alpha^t$ --
Line 58, replace "$\alpha^3$" with -- $\alpha^a$ --

Column 4,
Line 4, replace "concentration" with -- concatenation --
Line 16, replace "if" with -- of --

Column 5,
Line 18, after "$\alpha$ and" delete "a"
Line 30, replace "public information" with -- public key --
Line 34, replace "public information" with -- public key --
Line 61, replace "public information" with -- public key --

Column 6,
Line 12, replace "acknowledging" with -- acknowledge --
Line 37, after "$\alpha$ and" delete "a"
Line 49, replace "public information" with -- public key --
Line 53, replace "public information" with -- public key --

UNITED STATES PATENT AND TRADEMARK OFFICE
CERTIFICATE OF CORRECTION

PATENT NO. : 5,955,717
DATED : September 21, 1999
INVENTOR(S) : Scott A. Vanstone It is certified that error appears in the above-identified patent and that said Letters Patent is hereby corrected as shown below:

<u>Column 7,</u>
Line 2, replace "public information Yc" with -- public key $Y_c$ --

<u>Column 8,</u>
Line 8, replace "acknowledging" with -- acknowledge --

Signed and Sealed this

Ninth Day of July, 2002

Attest:

JAMES E. ROGAN
*Attesting Officer*     *Director of the United States Patent and Trademark Office*